Jan. 31, 1967  D. J. STEWART ET AL  3,300,860
SUBMARINE ATTACK DIRECTOR

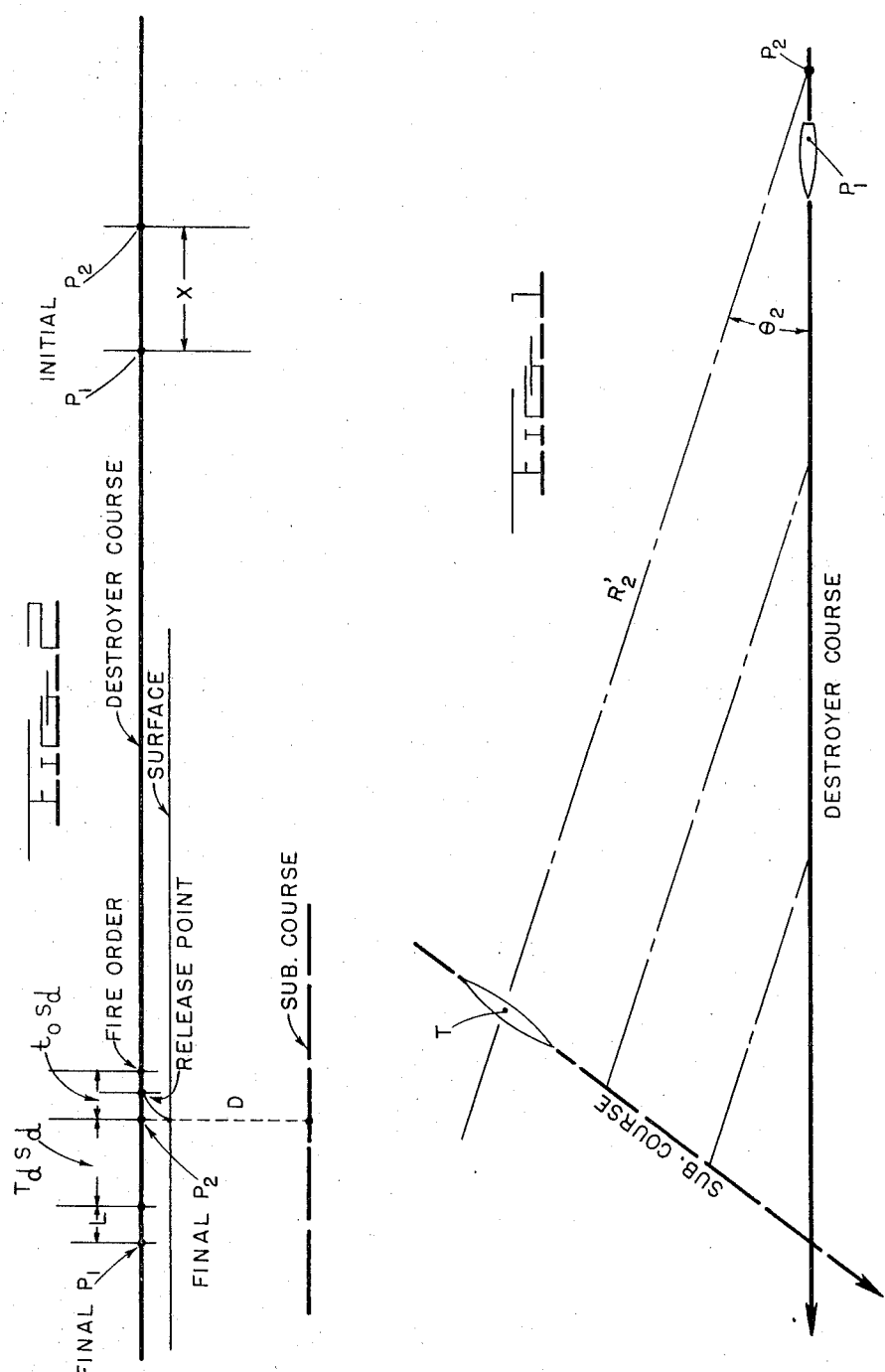

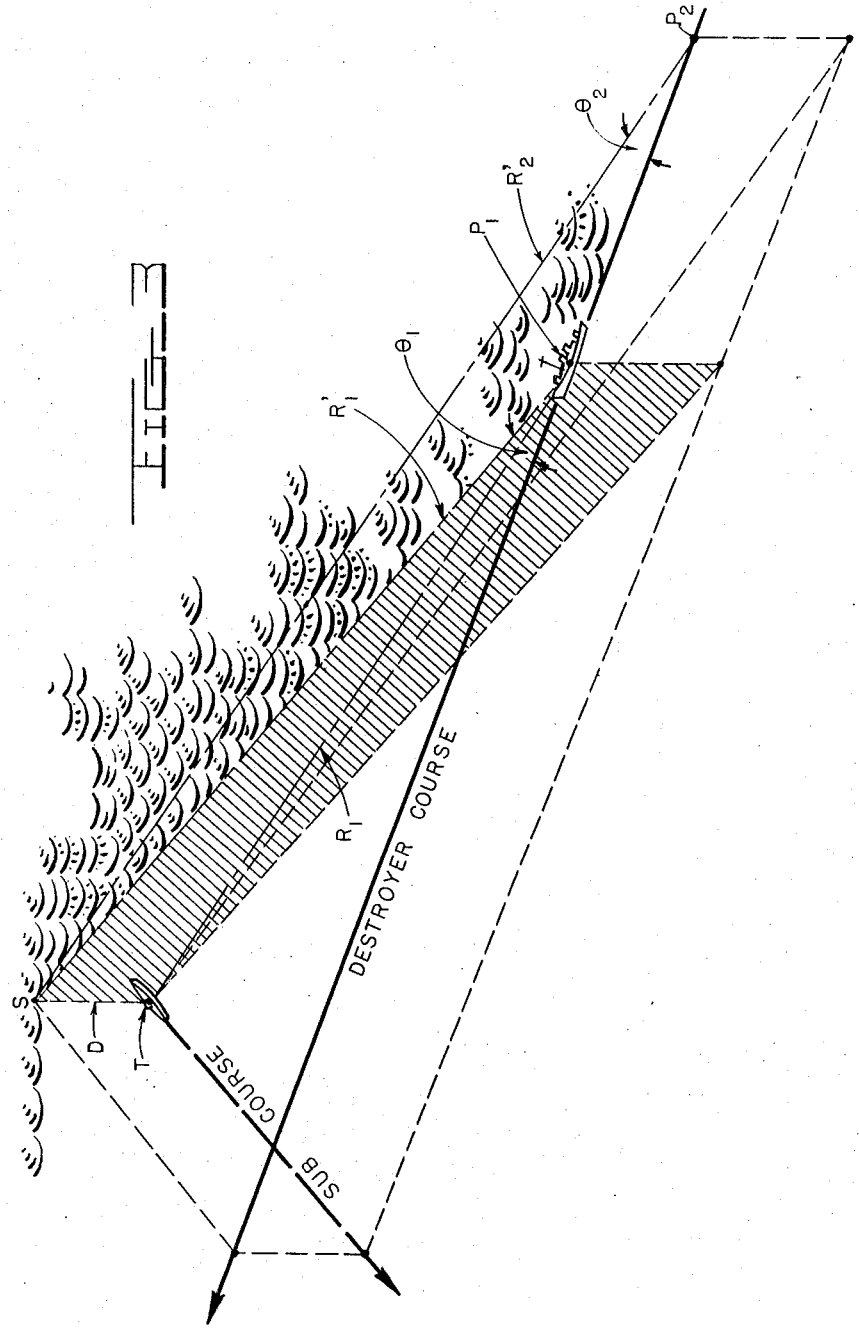

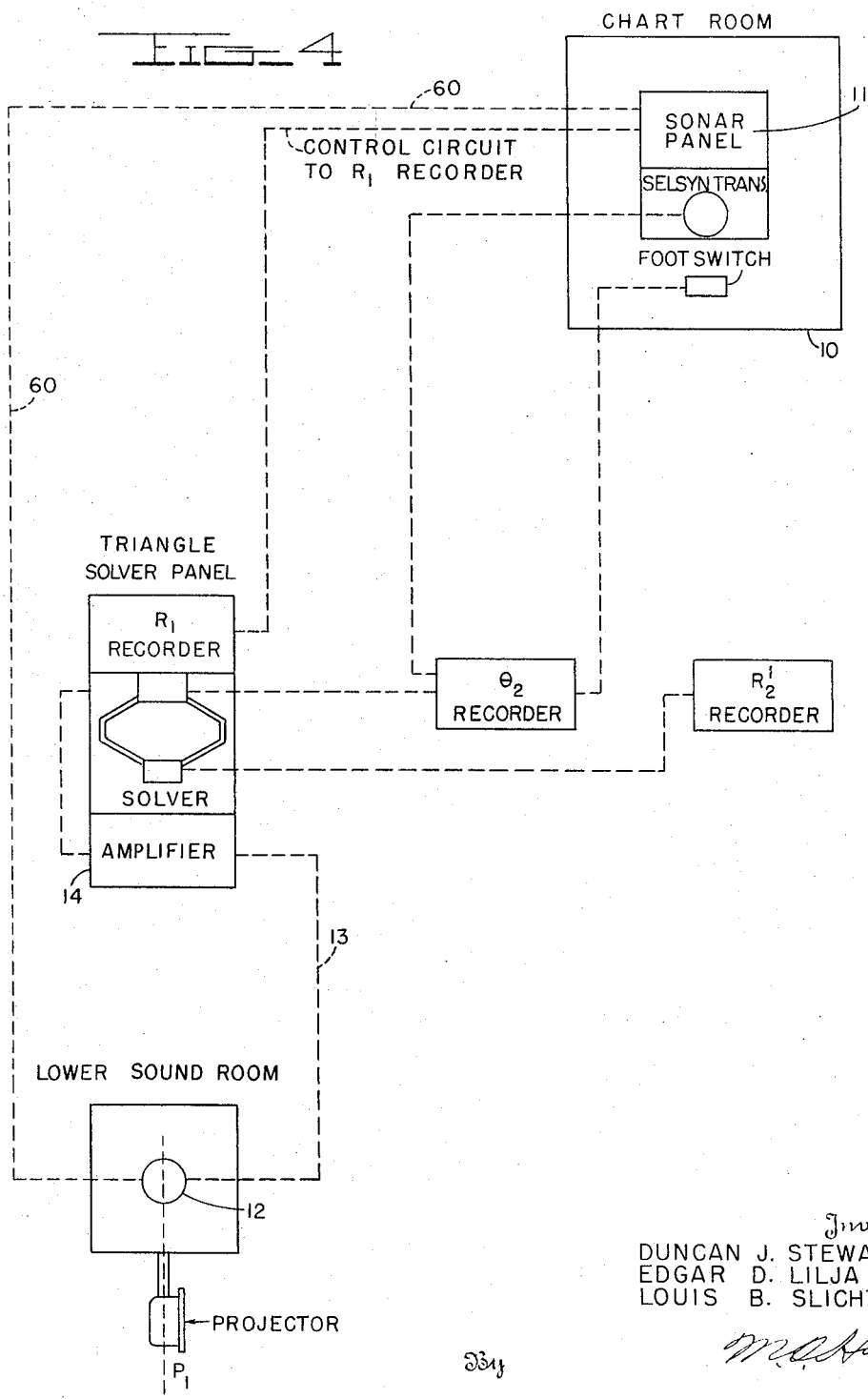

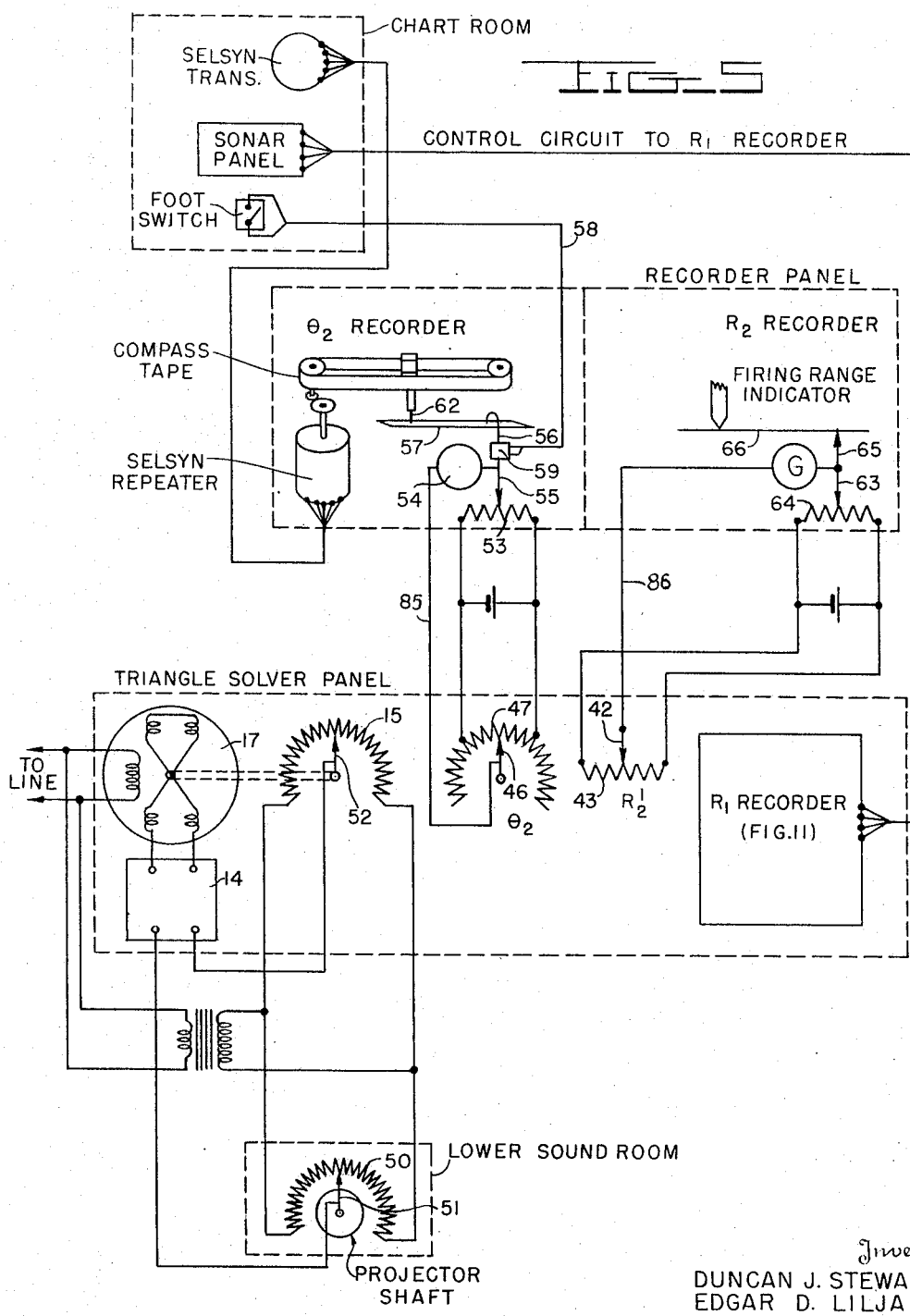

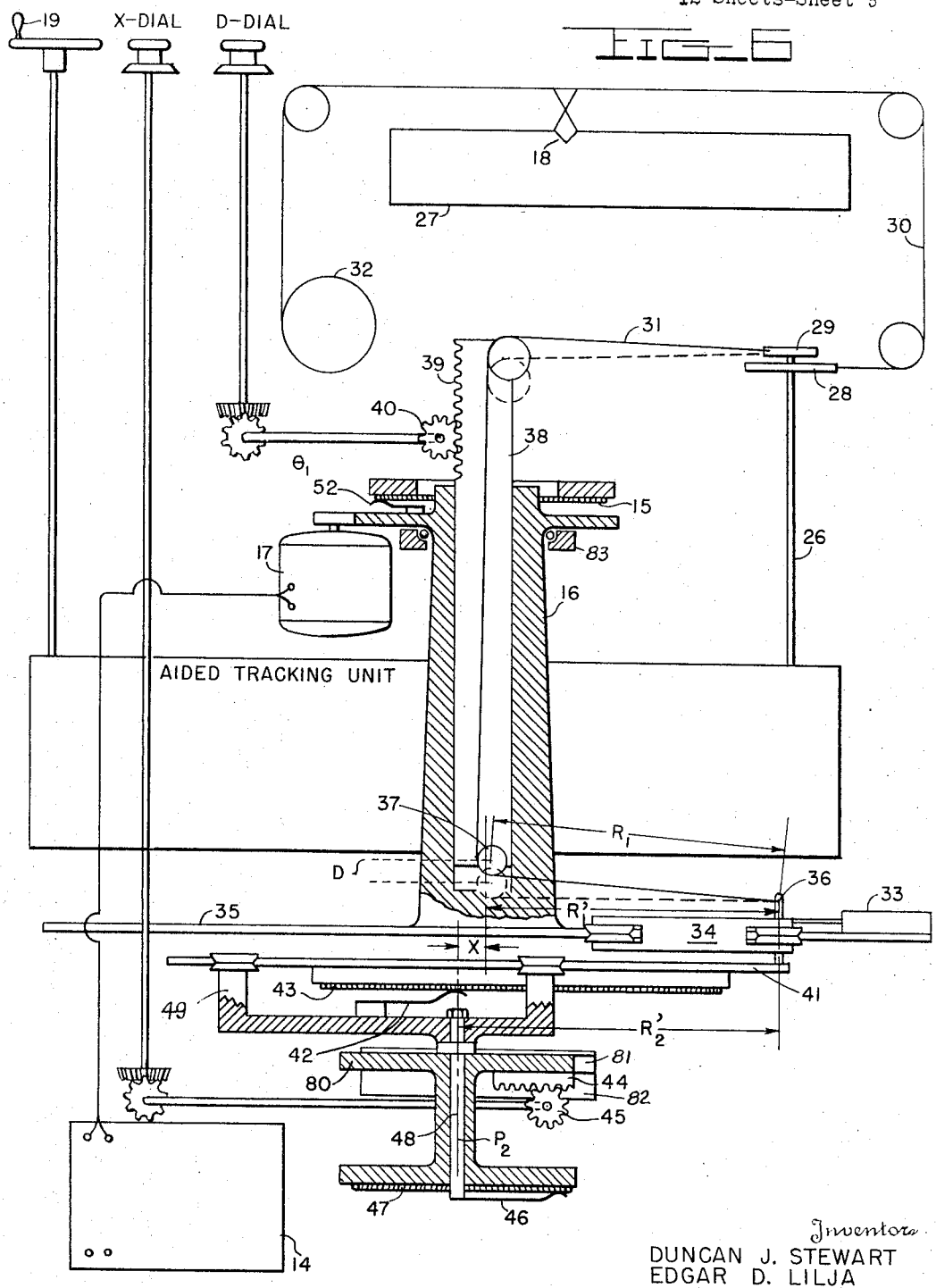

Filed Feb. 16, 1948  12 Sheets-Sheet 6

Inventors
DUNCAN J. STEWART
EDGAR D. LILJA
LOUIS B. SLICHTER

Attorney

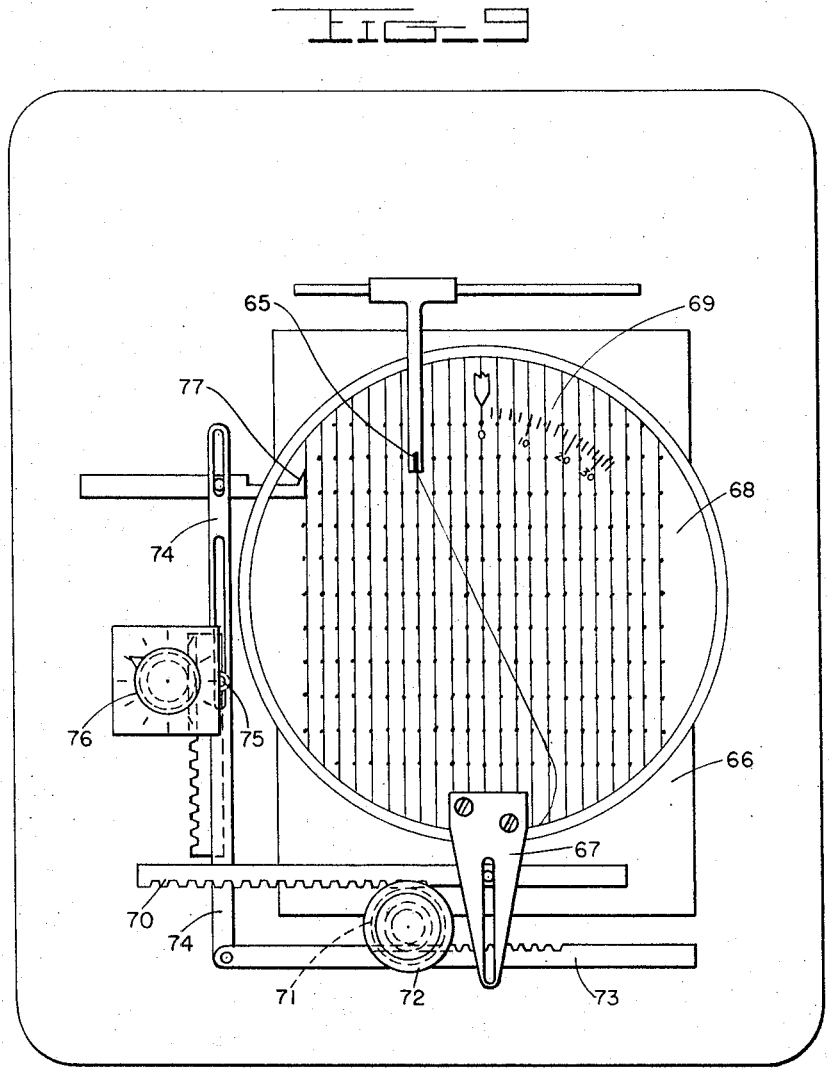

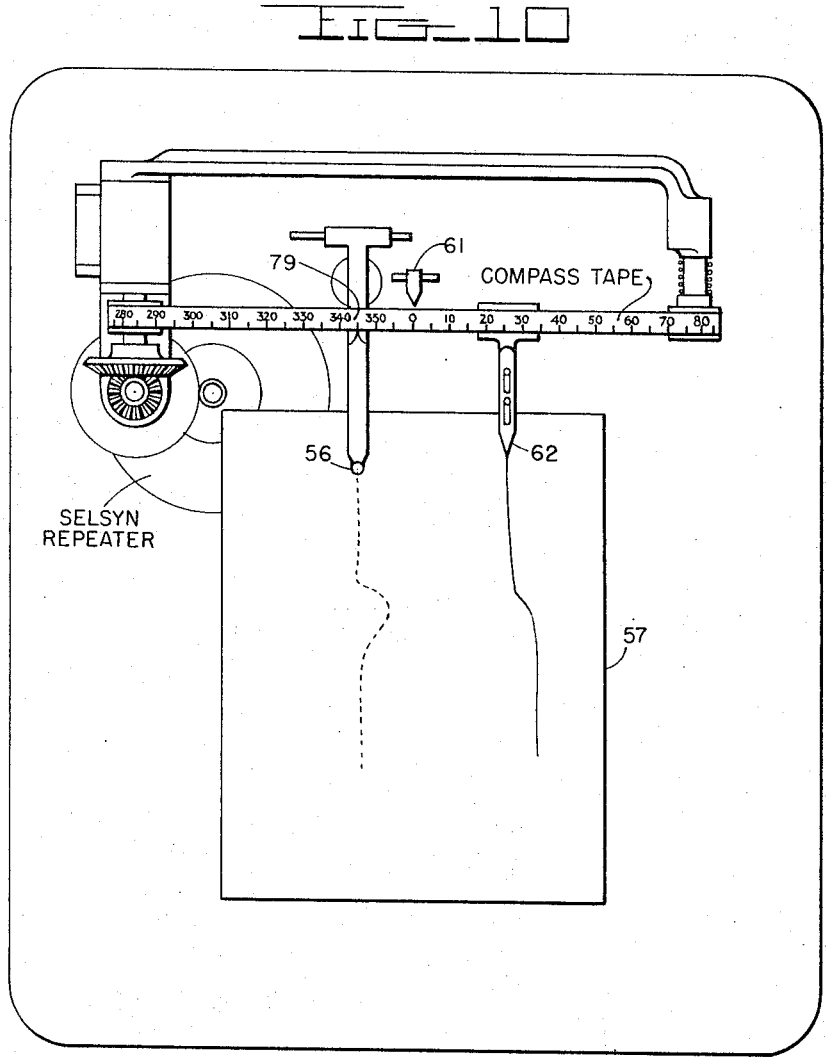

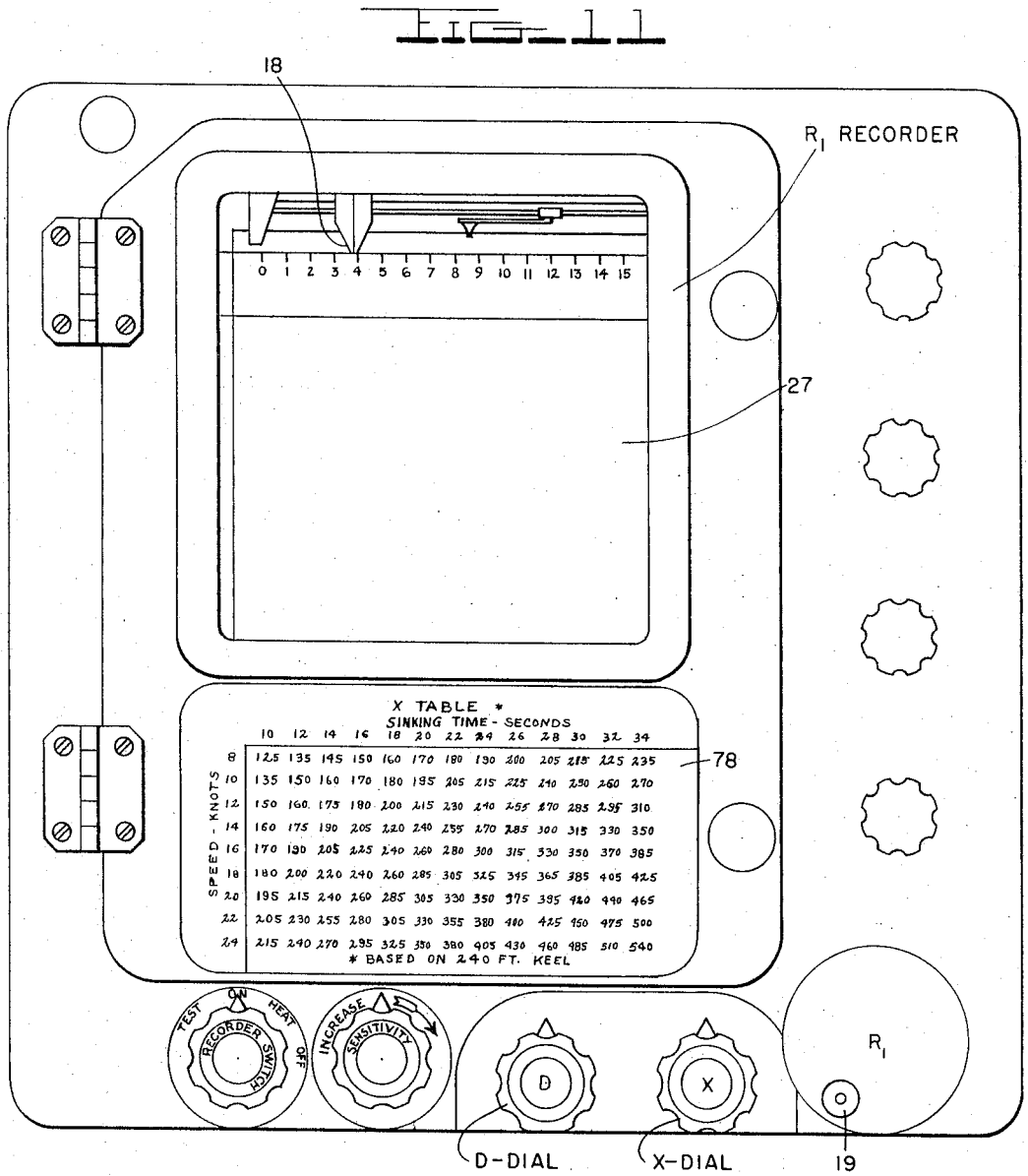

Jan. 31, 1967     D. J. STEWART ET AL     3,300,860
SUBMARINE ATTACK DIRECTOR

Filed Feb. 16, 1948     12 Sheets-Sheet 10

Inventors
DUNCAN J. STEWART
EDGAR D. LILJA
LOUIS B. SLICHTER

By M. C. Hayes

Attorney

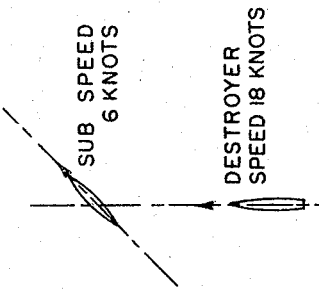
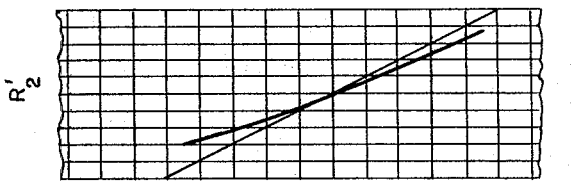
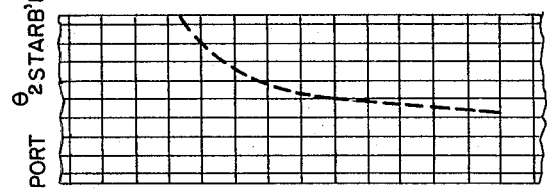
FIG.15
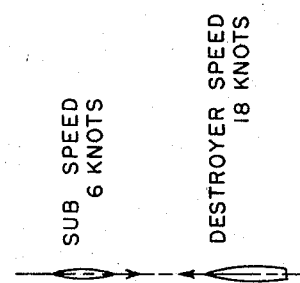
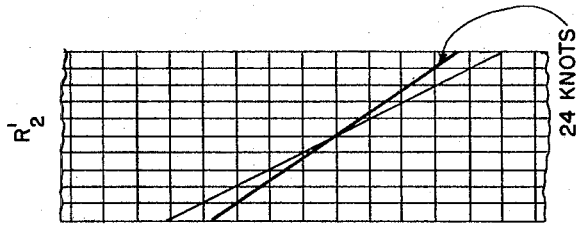
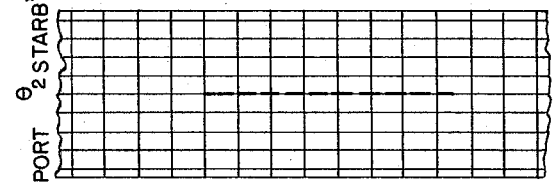
FIG.14
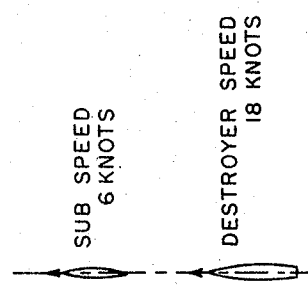
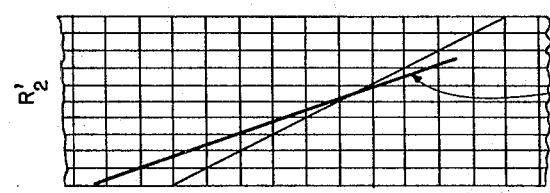
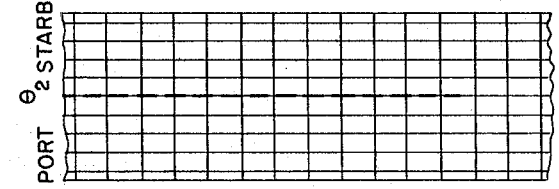
FIG.13
Inventors
DUNCAN J. STEWART
EDGAR D. LILJA
LOUIS B. SLICHTER
By M. O. Hayes
Attorney

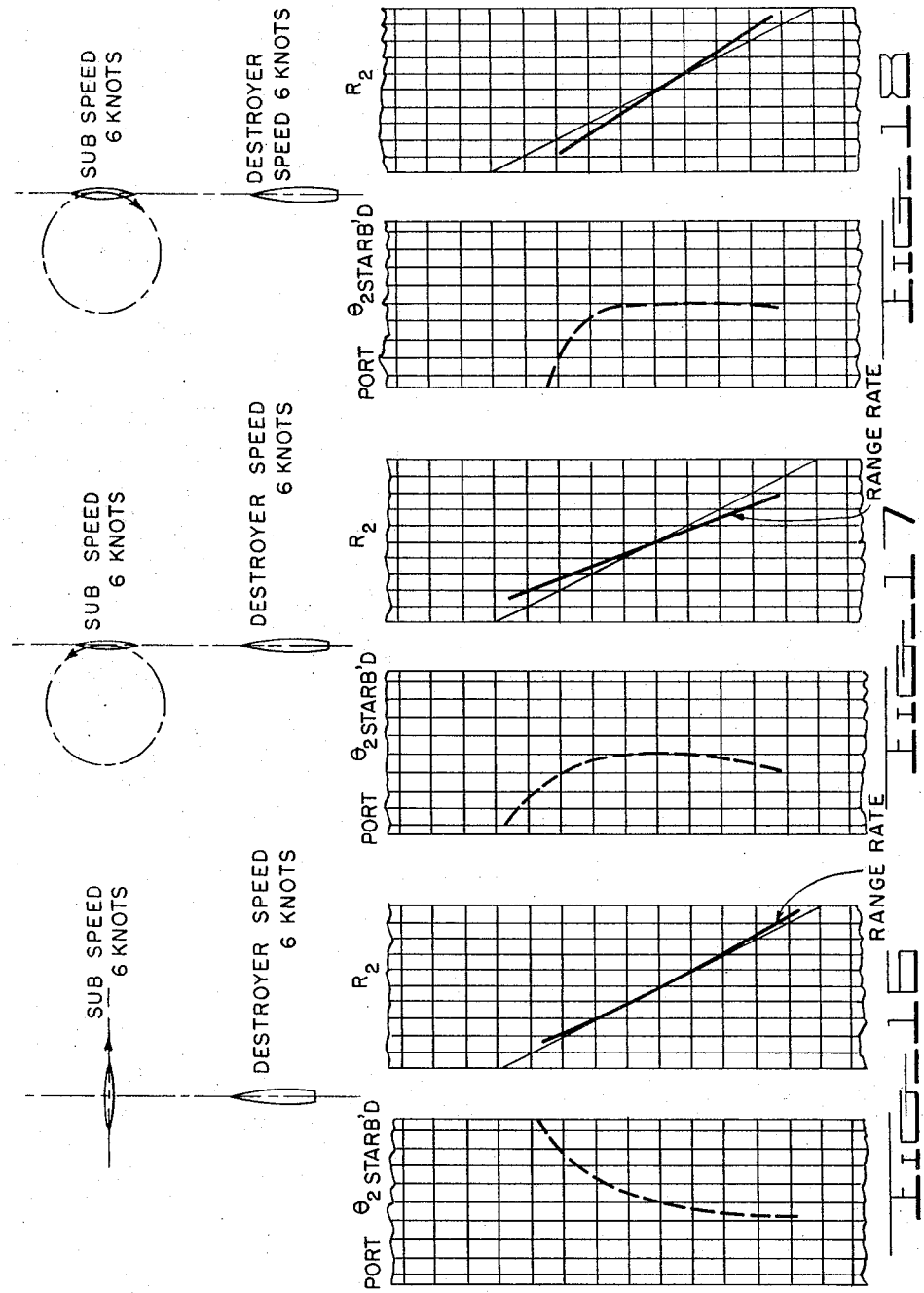

United States Patent Office 3,300,860
Patented Jan. 31, 1967

3,300,860
SUBMARINE ATTACK DIRECTOR
Duncan James Stewart and Edgar D. Lilja, Rockford, Ill., and Louis Byrne Slichter, Los Angeles, Calif., assignors, by mesne assignments, to the United States of America as represented by the Secretary of the Navy
Filed Feb. 16, 1948, Ser. No. 8,715
8 Claims. (Cl. 33—1)

The invention described herein may be manufactured and used by or for the Government of the United States of America for governmental purposes without the payment of any royalties thereon or therefor.

The present invention relates to attack directing systems for destroyers and more particularly to triangle solving apparatus and systems for directing a collision course between a submarine being attacked and a depth charge being carried by and to be dropped from the destroyer, and to the automatic prediction of a firing time necessary to effect a collision or near collision between a target submarine and a depth charge.

The problem of attacking a submarine with a depth charge dropped from a destroyer is complicated by the fact that it takes time for the depth charge to sink to the submarine's level. Because of this time delay, the depth charge must be dropped over the collision point (the crossing point of the two ships' courses) before the submarine reaches that point.

During the time that the depth charge is sinking to the submarine's level (depth D), the destroyer moves a distance $S_d t_d$ yards beyond the collision point (where $S_d$ is the destroyer speed in yards per second and $t_d$ is the depth charge sinking time in seconds through the distance D). It is as though the destroyer were towing the depth charge $S_d t_d$ yards astern, and it is found convenient to plan the attack on that basis. For greater accuracy the lapse of time from the firing order until the depth charge strikes the water, should also be taken into account. Assuming a straight line constant speed course for both the submarine and the hypothetical "towed" depth charge, it is only necessary, as is well known, to maintain the relative bearing constant to insure a collision. To maintain this constant bearing, the horizontal range must vary at a constant rate (called the range rate) since both submarine and depth charge have a constant speed course. It will be understood that the destroyer is equipped with a known or other suitable form of sonar which as is well known is an underwater range and direction finding system including a suitable underwater, directional, sound projector and receiver element hereinafter referred to as the projector. It will also be understood that the directional projector is mounted upon a vertical rotatable shaft for angular adjustment about a vertical axis.

In order to determine the relative bearing and horizontal range of the target submarine from the fictitious "towed" charge (hereinafter called the trailing point), we construct a scale model in a mechanism called a triangle solver in which certain points borne by parts of the mechanism and representing the submarine and the trailing point or point of location of the hypothetical "towed" depth charge, are properly positioned with respect to a point representing the destroyer. The position of the submarine is established by its relative bearing and range as measured from the projector of the destroyer's sonar equipment, while the trailing point is established as $L+S_d t_d$ yards astern of the projector (where L is the distance in yards between the projector and the depth charge racks).

An object of the invention is to provide a triangle solver mechanism, servo driven to maintain a scale model or representation of the instantaneous values of the different dimensional, directional and angular relations of various components of the attack course.

Another object is the provision of means for automatically indicating proper firing time derived from prediction obtained from the triangle solver.

Another object is the provision in a triangle solver of means for automatically converting a slant range into a horizontal range measured from a point other than the point from which the slant range is taken.

Various other objects and advantages of the invention will become apparent from a perusal of the following specification and the drawings accompanying the same.

In the drawings:

FIG. 1 is a diagram in horizontal plan showing collision courses between a submarine and a hypothetic, towed depth charge.

FIG. 2 is a diagram of the collision courses in side elevation looking from the bottom of FIG. 1.

FIG. 3 is a perspective view of the attack course showing the three dimensional relation of the collision courses and the various dimensional directional and angular relation involved.

FIG. 4 is a block diagram of the complete system.

FIG. 5 is a schematic circuit diagram of the complete system.

FIG. 6 is a diagram of the triangle solver.

FIG. 9 is a diagram of the $R_2'$ recorder.

FIG. 10 is a diagram of the $\theta_2$ recorder.

FIG. 11 is a front view of the top panel of the triangle solver showing the face of the $R_1$ recorder, its controls and the sinking time-chart.

Figure 8:
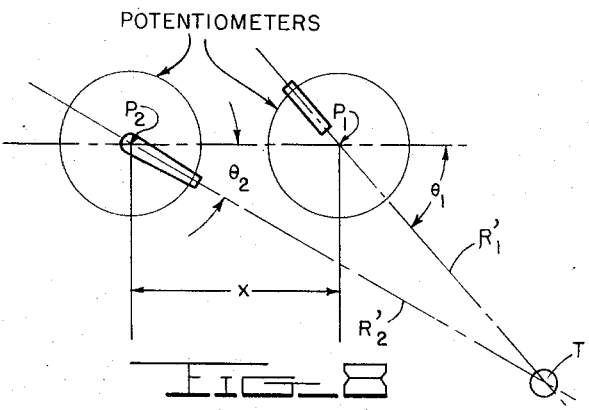
FIG. 8 is a diagram showing the relation of the angle measuring potentiometers.

FIGS. 13 to 18 inclusive are diagrams of different illustrative collision courses.

Referring to the drawings in detail, and first to FIGS. 1 to 3, it will be clear from FIG. 1 that with the submarine bearing the target point T and the destroyer bearing the reference point $P_1$ making straight-line intersecting courses as indicated and at constant speed, the points T and $P_2$, the latter representing the hypothetical towed depth charge, will collide provided the relative bearing $\theta_2$ is maintained constant. In FIG. 2, the reference points $P_1$ and $P_2$ (initial) represent the positions of the sound projector carried by the destroyer, and the hypothetical towed target or trailing point, respectively, early in the attack. Here, both the destroyer and target are moving to the left, and as the destroyer speed is constant, distances along the line representing its course also represent time. Thus after the conning officer gives the order to fire there is a slight delay before the depth charge is released. After the depth charge is released, it continues to travel at ship speed until it strikes the water at $P_2$ (final). The time from the firing order until the depth charge strikes the water is $t_0$ (ordinarily from one to two seconds), during which time the destroyer and the depth charge travel $t_0 S_d$ yards from the point marked "Fire Order" to the point "Final $P_2$." During the sinking time $t_d$, the depth charge release point travels $t_d S_d$ yards.

Because the complete attack course involves three dimensions due to the fact that the courses of the target submarine and the destroyer are in different horizontal planes, a clear understanding of the attack course will be had from the three-dimensional representation afforded by the perspective diagram of FIG. 3.

Here the relative bearing and range of the target T with respect to the destroyer's projector $P_1$, are $\theta_1$, and $R_1$, respectively, and the relative bearing and surface range with respect to the trailing point $P_2$ are $\theta_2$ and $R_2'$, respectively. The surface or horizontal range of the submarine with respect to the destroyer is designated $R_1'$ and is obtained by resolution from the slant range $R_1$ and the depth D. It is this relative bearing $\theta_2$ which is to be maintained constant, at least toward the closing of the range.

As indicated in FIG. 2, the order to fire should be given $t_oS_d$ yards before the depth charge arrives above the collision point. The trailing point is then $(t_o+t_d)S_d$ yards behind the collision point. It will be directly over the collision point when the depth charge has sunk to the submarine's level D. Since we have a record of the range $R_2'$, we can determine the range rate $dR_2'/dt$ and from this predict at what time $R_2'$ will reduce to zero (when $P_2$ will be directly over the collision point). This means that knowing the value of $t_o+t_d$ and the range rate, we can compute the range $R_2'=(t_o+t_d) \times dR_2'/dt$ at which the order to fire should be given.

Referring now to FIGS. 4 to 8, here is shown in diagrammatic form the novel triangle solver mechanism and auxiliary units through which an attack course as above outlined may be established and automatically maintained.

FIG. 4 shows the principal auxiliary units in the complete triangle solver system. First there is the sonar unit 10 of any known or other suitable form which may have its indicating and control panel 11 situated in a chart room and its projector equipment 12 situated in a lower sound room. The projector equipment is electrically connected with the instruments of the control panel through a signal cable 60 as is usual. The various components of the sonar equipment transmit, in a manner to be hereinafter described, relative bearing $\theta_1$ and range $R_1$ to the triangle solver proper. The triangle solver's solution is transmitted to the instruments of the conning officer's recording panel which latter presents a continuous record of relative bearing and range as measured from the trailing point. The dotted line connections between the triangle solver and the various units represent the electric cables connecting them. The circuit connections between the triangle solver and the auxiliary units are indicated schematically in FIG. 5.

Figure 7:
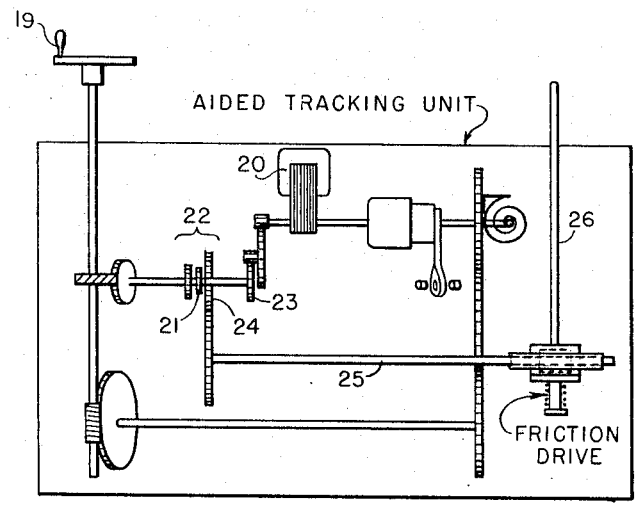
FIG. 7 is a diagram of the aided tracking unit.

FIGS. 6 and 7 show the triangle solver mechanism. The relative depth of points in FIG. 6 may be understood from FIG. 8. The point T in FIG. 8 represents the position of element 36 in FIG. 6. For the position shown in FIG. 8 some of the dimensions $R_1$, $R_2$ and $x$ would obviously be foreshortened in FIG. 6. In order for these dimensions to appear as shown in FIG. 6, it is necessary to assume $\theta_1$ and $\theta_2$ in FIG. 8 to be zero so that point T will be in line with $P_1$ and $P_2$. A thermionic amplifier 14 is introduced, in a manner to be later described, between a transmitting potentiometer driven by the projector shaft, and a receiving potentiometer 15 at the upper end of the central hub 16 in the triangle solver. The receiving potentiometer 15 controls a reversing motor 17 which automatically maintains the rotatable support or hub 16 in an angular position corresponding to that of the projector $P_1$. When the projector is trained on the submarine, this angular position corresponds to $\theta_1$.

The range $R_1$ is put into the triangle solver through the aided tracking unit, FIG. 7. This is a dual driven system for driving a range trace follower 18 by both manual and automatic means simultaneously to establish a movement of the follower in pace with the range indication of a varying range indicator or recorder as by arranging the follower to travel along with the trace of a varying range being registered or recorded. This recorder is installed in the top panel of the triangle solver as indicated in FIGS. 4 and 11, and may be of any known or other suitable form capable of plotting on its record sheet or chart 27 a curve having range as abscissa and time as ordinates. The recorder here shown is of the type having a fly-back recorder stylus, the reception of echo signals from the sonar equipment establishing successive points on the curve. It is the horizontal progress of these points with which the follower is made to keep pace. The manual driving means for the follower is a crank 19, and the automatic means is a governor controlled motor 20. The crank drives one terminal 21 of a spur gear differential 22 directly, and simultaneously adjusts the speed of the motor which drives the other terminal 23 of the differential. The intermediate gear 24 of the differential drives the follower 18 through shafts 25 and 26 in pace with the varying range indication. After a short cranking period, the motor drives the follower at approximately the correct speed (the speed imparted thereto by the manual drive) and very little cranking is required to keep the follower on the trace.

Motion is transmitted to the follower and other parts of the triangle solver from the aided tracking unit through a pair of cable drums 28-29 fixed to shaft 26, which drums haul in and pay off two cables 30 and 31. The right hand cable 30 which is maintained under tension by a cable return spring 32, carries the follower 18. The aided tracker operator causes this follower to follow the trace which appears on the associated echo range record or chart 27 by manipulation of the crank 19. As an incident to this "following" the left hand cable is displaced in proportion to range $R_1$. The cable 31 is maintained taut by a return spring 33, and determines the position of a car 34 on a horizontal guide arm 35 fixed to the lower end of the hub 16 and extending radially of the axis of the hub. Thus the car is constrained to move along a straight line radial to the axis of the hub. The end of the cable is fixed to a target point element in the form of an anchor post 36 mounted on the car 34. The anchor post is thereby constrained to move along a straight line radial to the axis of the hub together with car 34 and constitutes a target determining means slidably mounted on the guide arm 35 which is constrained to move along a radius to the axis of the hub. Cable 31 passes over a sheave 37 which is journaled in a vertically movable, hollow shaft 38 splined to the hub. The vertical displacement (by rack 39 and pinion 40) of the shaft and sheave 37 is the depth reference point or D setting corresponding to the estimated depth of the submarine. Thus the distance from the sheave to the intersection of the guide arm with the hub axis represents the vertical side of the vertical right triangle defined by the ship's projector, the target and the point directly below the projector at the target level. As indicated diagrammatically in FIG. 6, this setting is controlled by the D-dial FIGS. 6 and 11. The scale for this adjustment is calibrated in feet. Now, because the length of cable between the sheave and the anchor post 36 corresponds to the slant range $R_1$, the horizontal displacement of the anchor post with respect to the hub center will correspond to the horizontal range $R_1'$.

Since the angular position of the hub and guide arm 35 corresponds to the relative bearing $\theta_1$, and the radial displacement of the anchor post along the guide arm corresponds to the horizontal range $R_1'$ of the submarine, the position of the anchor post corresponds to the point T in FIG. 3. The hub center corresponds to point $P_1$ in FIG. 3.

Coupled pivotally to the car 34 vertically below the anchor post 36 (point T), and thus effectively pivotally coupled to the anchor post, is the end of a sliding radius arm 41 mounted to slide through a guide bearing 49 consisting of a group of four grooved guide rollers, two at each side of the radius arm 41. The guide bearing 49 is carried on a shaft 48 for rotation about a vertical axis representing a vertical axis through the point $P_2$ of FIGS. 1 to 3. The slide arm 41 is thus free to rotate about this vertical axis while constrained to slide along a radius of the axis by the guide rollers. The length of this slide arm from its center of rotation about the axis through the point $P_2$ to the end coupled to the anchor post 36 (point T) corresponds to the range $R_2'$ and is measured electrically by the potential of the wiper arm 42 of a potentiometer whose resistance strip 43 is fastened to the slide arm and whose wiper arm bears on the strip at a point lying in the vertical axis through $P_2$. To enable the shaft 48 to be displaced horizontally a distance X away from the axis $P_1$ of the hub 16, the shaft 48 is journaled in a slidable support 80 slidably mounted in a race 81 in a stationary or fixed support 82 fixed in relation to the stationary bearing support 83 for the hub 16. It will be understood that the parts 82 and 83 are parts of a common stationary supporting frame. Displacement of the axis $P_2$ from the hub axis $P_1$ is effected manually through a rack 44 and pinion 45 controlled by the X-dial FIGS. 6 and 11. This sets in the amount by which the point $P_2$ (directly above the depth charge when the latter has sunk to the depth D) trails the projector. The value of X depends on a number of factors, but for any particular ship varies with the speed, ammunition and the estimated depth D. A chart 78 mounted on the $R_1$ recorder, FIG. 11 shows values of X for various ship speeds and sinking times. The slider or wiper arm 46 of a circular potentiometer 47 is coupled to the shaft 48 which rotates with the guide bearing 49 and slide 41 about the axis $P_2$. The angular position of the slide 41 and consequently the shaft 48 and wiper arm 46, is the bearing $\theta_2$ and is measured electrically by the potential of the wiper arm 46.

The bearing $\theta_1$ is put into the triangle solver from a transmitting potentiometer 50, FIG. 5, whose wiper arm 51 is made to rotate with the projector shaft in any known or other suitable manner, the fixed angular relation between the wiper arm and projector being such that the arm will be positioned centrally of the potentiometer resistance strip, as shown in FIG. 5, when the projector is trained forward of the destroyer. With the potentiometer 50 and the receiving potentiometer 15 connected through a Wheatstone bridge connection and an amplifier 14 to the reversing circuit of the reversing motor 17 in known manner as indicated in FIG. 5, the wiper arm 52 of the receiving potentiometer, which arm is fixed with relation to the hub 16 driven by the motor, will follow the angular movement of the projector. From the above it will be seen that the output of the triangle solver is two voltages, one proportional to $\theta_2$ (the relative bearing from the trailing point to the target) and the other proportional to $R_2'$ (the surface range from the trailing point to the target).

Figure 12:
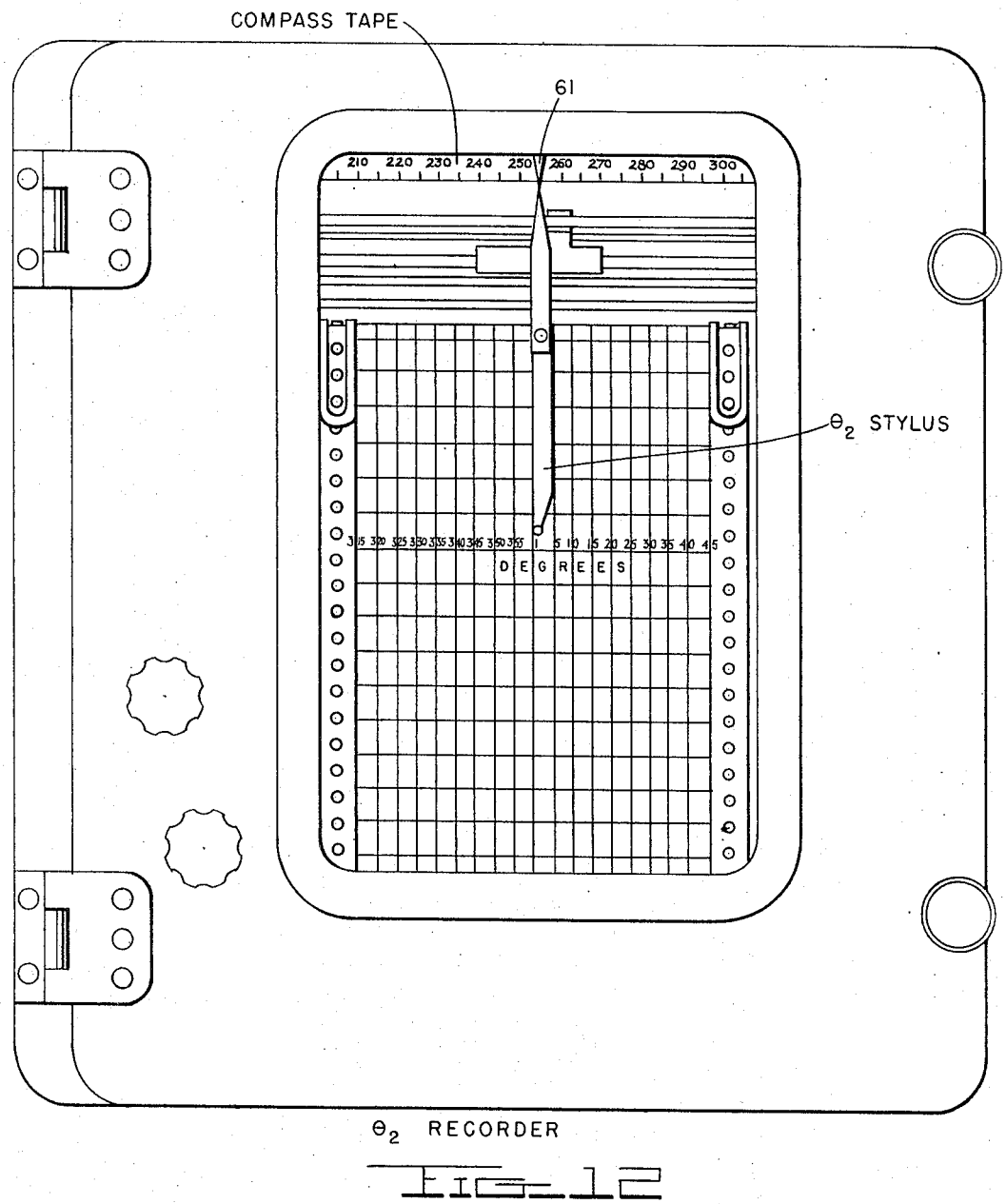
FIG. 12 is a front elevation of the $\theta_2$ recorder.

The bearing $\theta_2$ as represented by the potential of the wiper arm 46 of potentiometer 47 is transmitted to the $\theta_2$ bearing recorder, FIGS. 4, 5 and 10, designated "$\theta_2$ Recorder," which recorder may be of any known or other suitable type capable of plotting a record of the course with the bearing as abscissa and time as ordinates, such as the typical recorder shown in front elevation in FIG. 12.

The bearing $\theta_2$ is transmitted from the triangle solver to the $\theta_2$ recorder through a Wheatstone bridge connection between the transmitting potentiometer 47 and a receiving potentiometer 53 with the differenial or unbalance detecting circuit 85 connected to control a reversing motor 54 driving the wiper arm 55 of the receiving potentiometer as indicated diagrammatically in FIG. 5. The wiper arm 55 is thus made to move along a straight line in either direction in proportion to the angular movement of the wiper arm 46. FIGS. 5 and 6. A recording stylus 56 driven with the wiper arm 55 cooperates with a record sheet 57 time driven transversely to the movement of the stylus to record or plot variations in bearing $\theta_2$ against time, in a manner well understood in the art. The $\theta_2$ recorder stylus 56 moves continuously in accordance with the corresponding output of the solver but is normally raised above the record sheet and makes a mark only when the auxiliary marking circuit 58 controlling movement of the stylus through a solenoid 59 is closed through a foot switch located within easy reach of the echo ranging operator in the chart room. Since the echo ranging operator, who is given control of the angular movement of the projector through suitable remote control over cable 60, is continuously sweeping the submarine with the projector for the purpose of obtaining the exact bearing and aspect of the submarine, the $\theta_2$ stylus 56 hunts continuously during an attack. However, the hunting is not recorded due to the stylus being normally raised out of engagement with the record sheet. To insure that the $\theta_2$ record will contain only good bearings, the operator will depress the foot switch each time he thinks the projector is pointed directly at the target. The record of the relative bearing $\theta_2$ is thus a series of dots representing good bearings with substantially no hunting. Above the chart or record sheet, FIGS. 5, 10 and 12 is a compass tape operable in known manner to repeat the readings of the ship's compass as through a selsyn transmitter and repeater as indicated in FIG. 5. This affords an indication of the ship's true bearing or heading. A pointer 61 FIGS. 10 and 12 fixed to the recorder stylus cooperates with the tape to indicate the ship's heading. In addition to the relative bearing stylus there may be provided, as shown in FIG. 10, a ship's heading stylus 62 carried by the compass tape and extending over the record sheet 57 into operative relation therewith. An extension 79 of the recorder stylus 56 continuously indicates on the compass tape the true bearing corresponding to the relative bearing indicated below on the chart.

The range of $R_2'$ as measured electrically by the potentiometer 42–43 FIGS. 5 and 6 is transmitted to a repeating potentiometer 63–64 and reversible driving motor G therefore in the $R_2'$ recorder FIG. 5, through the differential or unbalance detecting circuit 86 of a Wheatstone bridge connection as indicated diagrammatically in FIG. 5. The wiper arm 63 is thus moved along a straight line in either direction in proportion to the linear movement of the wiper arm 42. Moving with the wiper arm 63 is a recording stylus 65, the stylus moving horizontally across a record sheet or chart 66 which latter is time driven vertically downward, all as well understood in the art for plotting variations in range against time, with range as abscissa and time as ordinates. In both the $\theta_2$ and $R_2'$ recorders, which are mounted on the bridge of the destroyer, the record paper has a speed preferably of three inches per minute. A little over one minute's run in continuously in view. An arm 67, having a hub portion 68 of transparent sheet material ruled in parallel lines longitudinal of the arm, is mounted over the face of the chart for rotation about the center of the chart face, to enable the rulings to be placed parallel to the slope of the range trace or any portion thereof. The angular position of the arm is then a measure of the range $dR_2'/dt$, which rate may be read directly from a scale 69 on the transparent portion 68. Antiparallax dots on the transparent portion 68 of the arm 67 assist in properly aligning the eye with the firing index and chart record. The arm 67 is arranged to be moved by a rack 70 driven by a pinion 71 operated by a range adjusting knob 72. The pinion also drives a rack 73 which moves the lower end of a multiplying lever 74 as a function of the range rate. The fulcrum 75 of the lever is vertically adjustable according to firing lag plus the sinking time ($t_o + t_d$), by means of a calibrated knob 76 acting through a rack and pinion as indicated diagrammatically in FIG. 9. The upper end of the multiplying lever imparts horizontal movement to a firing range indicator 77 in proportion to the product of range rate and sinking time. The proportions are such that the firing range indicator shows to scale the recorded range at which the depth charge must be released if the range is to be zero ($P_2$ directly over the collision point) when the depth charge reaches the submarine level.

The successful application of the triangle solver depends on the conning officer's ability to visualize the course being taken by the target from examination of the charts of the $R_2'$ and $\theta_2$ recorders, FIGS. 9 and 10. FIGS. 13 to 18, inclusive, illustrate six typical target courses at 6 knots and the destroyer at 18 or 6 knots.

In FIG. 13, the submarine is proceeding directly away from the destroyer. This fact could be determined readily from the charts, since the $\theta_2$ chart shows a constant relative bearing of 0° and a constant range rate less than ship's speed, by 6 knots.

In FIG. 14, the submarine is again directly ahead but coming toward the destroyer. This is indicated by the constant value of $\theta_2$ at $0_o$ relative bearing and a range rate greater than own ship's speed. The range rate reading in this case would be 24 knots.

In FIG. 15, the submarine is crossing the destroyer's bow at an angle of 45°. The records show that the target is proceeding to starboard at a rate less than destroyer speed and therefore going away from the destroyer. The angle of intersection of the courses is indicated by the rate at which the bearing changes.

FIG. 16 shows a course in which the submarine is crossing the destroyer's bow at a 90° angle. This condition is easily seen from the charts, which show that the bearing is changing rapidly to starboard and the range rate is practically equal to own ship's speed.

FIG. 17, shows a course in which the submarine is initially going away from the destroyer on a circular, port course tangent to that of the destroyer. This might be deduced from the fact that the $\theta_2$ trace remains nearly constant at zero and then deviates to port at an increasing rate. The direction of the submarine is shown to be away from the destroyer by the fact that the range rate is less than ship's speed.

FIG. 18, shows a tangent, circular, port course in which the submarine is initially moving toward the destroyer. The records show this to be true as the bearing remains nearly constant at zero for a time and then turns sharply to port, while the range rate is greater than destroyer's speed.

If, in the courses shown in FIGS. 15 and 16, the submarine's course had been to port, the $R_2'$ record would be the same and the $\theta_2$ record would be symmetrical about the zero axis. If the circular courses shown in FIGS. 17 and 18 had been on the starboard side, the $R_2'$ records would be interchanged and the $\theta_2$ record symmetrical about the zero axis.

The services of two men and two officers are required for operating the present system. They are the regular sound operator, the $R_1$ range tracker, the firing officer and the conning officer.

The duties of the sound operator are the same as in any other method of sonic attack except that in the present system he is provided with the foot switch, FIG. 5, which he depresses to indicate or record good bearings. His method of searching is standard and consists of ranging from side to side to the cut off points. As soon as a sonic contact with a target is established, the sound operator reports the bearing and range to the coming officer. He then continues his ranging, calling out the range at 100 yard intervals as indicated by the usual visual indicator. When the range is reduced to 1500 yards (the maximum range of the triangle solver), the sound operator switches on the control circuits leading to the $R_1$ recorder, FIGS. 4, 5 and 11. Thereafter the sound operator continues to range from side to side, depressing the foot switch momentarily whenever he has a good bearing.

The $R_1$ tracking operator, during an attack, operates the triangle solver and tracks the $R_1$ range trace on the $R_1$ recorder. Just before an attack, when the sound operator reports contact, the tracking operator sets the D and X dials as directed by the conning officer who determines D by estimation and X from the table on the door over the $R_1$ recorder, FIG. 11. The X value must be changed during a run if the conning officer decides to change ship speed.

The firing officer's post is at the $R_2'$ recorder. As soon as contact is established he starts the $\theta_2$ and $R_2'$ recorders and adjusts the sinking time dial on the $R_2'$ recorder as instructed by the conning officer. He then proceeds to maintain alignment of the rulings on the transparent portion 68 of the range rate, determining arm 67 of the $R_2'$ recorder with the slope of the $R_2'$ record. Small fluctuations in slope caused by $\theta_2$ ranging and irregular $R_1$ tracking should not be followed with the range rate rulings. The firing officer gives the order to fire when the recording stylus is opposite the tip of firing time indicator 77. However contact is often lost before firing time has been reached and the $R_2'$ record becomes constant. When this occurs the zero slope part of the trace is ignored and the firing order is given when the latest good part of the record intersects the ruling which passes over the firing time indicator.

The conning officer directs the attack. His post is at the $\theta_2$ recorder, from which he determines the steering necessary to intercept the target. He orders ship speed and from the speed and sinking time $t_d$ (which does not include the firing lag $t_o$) he determines X from the chart on the $R_1$ recorder to be set on the X dial by the tracker operator. The conning officer also gives the firing lag plus the sinking time $(t_o+t_d)$ to the firing officer for setting the sinking time knob 76 of the firing time computer on the $R_2'$ recorder.

An example of an attack procedure is as follows: Upon notice that a target has been detected and at what bearing and range, the ship will be brought around immediately to that bearing, unless too close in for a predictor attack to be made. The chart drives are started and the operators ordered to begin tracking. Ship speed is ordered and closely held.

The helmsman holds as true a course as possible and the conning officer now observes the $\theta_2$ record, on the conning officer panel. If the line creeps to the left systematically the target is crossing to port and the conning officer should order a turn to port. If the line creeps to the right a corresponding turn to starboard should be made. If there is no systematic drift of the $\theta_2$ record, the target is either stationary or moving directly away from or directly toward the destroyer. Which of these is the case will shortly be apparent by noting the value of the rate of change (in knots) of $R_2'$ as shown by the fixed scale on the $R_2'$ recorder and comparing it with the ship's speed. Obviously the $R_2'$ rate will differ from ship's speed by the component of target speed which is parallel to own ship's course.

Sufficient turn should be made to bring the relative bearing of target to starboard if target is moving to port and to port if moving to starboard. Up to at least 500 yards of closing the range, the amount of lead should preferably be about half that required to hold $\theta_2$ constant. This would be difficult to determine and need not be accurately determined. It is sufficient to see that the $\theta_2$ record is kept on the proper side of center, thus necessitating a further turn in the same direction at intervals.

The procedure just described should be followed until $R_1$ is about 500 yards ($R_2'$ will depend on X but will usually be about 700 yards). At this time close watch should be kept of both the $R_2'$ and $\theta_2$ recorders to detect turning of the target or change in its speed. This is the critical point in the attack. If no change in target course and speed is noted by the time $R_1$ equal 400 yards, the destroyer's course should be altered to hold $\theta_2$ constant and rudder added as necessary to this end.

As soon as a fairly smooth record of $R_2'$ is available, the transparent portion 68 of the pivoted arm should be set to make its rulings as nearly parallel as possible with the trace of $R_2'$. The rate of change of $R_2'$ will immediately appear and the officer will note whether it equals, is greater than or is less than own ship's speed. This will at once tell him that he is, respectively, on, behind or ahead of the target's beam.

Firing range will immediately appear but will not be used at once. The arm setting will be corrected right up to loss of contact and then left set. Firing range then appearing should be used to determine firing time.

Firing time will be that time when the $R_2'$ recording stylus reaches the firing range indicated by the firing range indicator 77, except that contact will usually be lost some time in advance and the firing time must be determined by coincidence of an extension of the trace and the firing range indicator.

What is claimed is:

1. A triangle solver comprising a horizontal guide arm rotatable about a vertical axis and extending along a radius of said axis, a car element slidably mounted on said guide arm and thus constrained to move along a radius to said vertical axis, an anchor post mounted on the car element for determining a target point, adjustable means determining a depth reference point on said axis adjustable along said axis with respect to the point of intersection of said axis and the radius along which said anchor post is constrained to move with said car, a flexible cable connected at one end to the anchor post, means pulling the cable through said depth point to pull the post along said radius, a vertical shaft adustably spaced from said first axis in a fixed direction, a sliding radius arm constrained to slide along a radius of said vertical shaft, means pivotally connecting a vertical extension of said anchor post and one end of the radius arm, means for adjusting the horizontal distance between said vertical axis and the axis of said vertical shaft, means for adjusting the angle of said guide arm, means for measuring the angular position of said radius arm and variable resistance means variable with movement of the radius arm for measuring the radial distance between the axis of the vertical shaft and the pivotal connection of the radius arm with the anchor post.

2. A triangle solver comprising a horizontal guide arm rotatable about a vertical axis and extending along a radius of said axis, a car element slidably mounted on said guide arm and thus constrained to move along a radius to said vertical axis, an anchor post mounted on the car element for determining a target point, adjustable means determining a depth reference point on said axis adjustable along said axis with respect to the point of intersection of said axis and the radius along which said anchor post is constrained to move with said car, a flexible cable connected at one end to the anchor post, means pulling the cable through said depth point to pull the post along said radius, a vertical shaft adjustably spaced from said first axis in a fixed direction, a sliding radius arm constrained to slide along a radius of said vertical shaft, means pivotally connecting said anchor post and one end of the radius arm, means for adjusting the horizontal distance between said vertical axis and said vertical shaft, means for adjusting the angle of said guide arm, means for measuring the angular position of said radius arm and variable resistance means variable with movement of the radius arm for measuring the radial distance between the vertical shaft and the pivotal connection of the radius arm with the anchor post, said radial distance measuring means comprising a potentiometer forming two arms of a Wheatstone bridge.

3. A triangle solver comprising a horizontal guide arm rotatable about a vertical axis and extending along a radius of said axis, a car element slidably mounted on said guide arm and thus constrained to move along a radius to said vertical axis, an anchor post mounted on the car element for determining a target point, adjustable means determining a depth reference point on said axis adjustable along said axis with respect to the point of intersection of said axis and the radius along which said anchor post is constrained to move with said car, a flexible cable connected at one end to the anchor post, means pulling the cable through said depth point to pull the post along said radius, a vertical shaft adjustably spaced from said first axis in a fixed direction, a sliding radius arm constrained to slide along a radius of said vertical shaft, means pivotally connecting said anchor post and one end of the radius arm, means for adjusting the horizontal distance between said vertical axis and said vertical shaft, means for adjusting the angle of said guide arm, means for measuring the angular position of said radius arm and variable resistance means variable with movement of the radius arm for measuring the radial distance between the vertical shaft and the pivotal connection of the radius arm with the anchor post, said angular position measuring means comprising a potentiometer forming two arms of a Wheatstone bridge whose differential circuit controls an angle recording device, and said radial distance measuring means comprising a potentiometer forming two arms of a Wheatstone bridge whose differential circuit controls a range indicating device.

4. A triangle solver for computing range and bearing on a target comprising a hub member rotatable about a relatively vertical axis, a lineal guide fixed to the hub and extending radially from the hub axis, a target-point determining means slidably mounted on said guide, a depth reference-point determining means adjustable along the axis of the hub, means varying the lineal distance between the depth reference-point determining means and the target point means in proportion to an actual slant distance from the hub axis to the target to move said target point means along said guide in proportion to the horizontal projection of said actual distance, a vertical shaft adjustable laterally with respect to the said hub axis in a fixed direction, a slide arm constrained to slide along a radius of said vertical shaft, said slide arm being pivotally connected with said target point determining means, means for rotating the hub to adjust the angle of said lineal guide about the axis of said hub to correspond to the bearing of the target from the said axis, means operated by said vertical shaft for measuring the angle between said slide arm and said fixed direction, and variable resistance means variable with movement of the slide arm for measuring the distance between said vertical shaft and said target point determining means.

5. A triangle solver for computing range and bearing on a target comprising a support rotatable about a vertical axis representing the vertical side of a vertical right triangle, lineal guide means fixed relative to said support extending radially from said vertical axis and representing the horizontal side of the triangle, a target point element slidably mounted on said guide determining the corner of the triangle opposite the vertical side, means adjustable vertically along the axis of said support to and from the guide means a distance representing the length of the vertical side of the triangle, means varying the straight line distance between the target point element and said vertically adjustable means to represent the known length of the hypotenuse of the vertical right triangle, whereby the target point is moved along said radial guide means to a distance from said vertical axis representing the length of the horizontal side of the same triangle, a shaft rotatable about an axis parallel to the axis of said support, means for varying the spacing of said axes horizontally in a given direction, a sliding arm mounted radially on said shaft to rotate with and slide radially thereof in a horizontal plane and pivoted at one end to said target point element, whereby three points lying, one vertically above the target point element, a second in the axis of the support and a third in the axis of said shaft, in a common horizontal plane, define the corners of a horizontal triangle whose side extending from the said shaft to the point above the target point element will assume an angle to the line of direction between said axes equal to the bearing and will have a length proportional to the range.

6. In a triangle solver carried by a surface craft for directing a collision course between an underwater craft and a given missile to be dropped from the surface craft, range indicating means having a stylus movable in amount corresponding to range, a primary follower for the stylus, a tracking unit for moving the primary follower in pace with said stylus to track the rate of range closure as established by the rate of movement of the stylus, a secondary follower element constrained to move in a straight horizontal line radial to a given vertical axis, means establishing a point on said vertical axis spaced from the point of intersection of the horizontal radial line with the axis a distance representing the depth of the level of the underwater craft, means movable with the movement of the primary follower for moving said secondary follower element along its constrained line of movement to close the distance between it and said established point, and means maintaining a second horizontal line in intersection with the vertical axis of said secondary follower element and a second vertical axis horizontally spaced from said first axis a distance representing the time required for the given missile to reach the level of the underwater craft, after release from the surface craft.

7. In a triangle solver carried by a surface craft for directing a collision course between an underwater craft and a given missile to be dropped from the surface craft, range indicating means having a stylus movable in amount corresponding to range, a primary follower, for the stylus, a tracking unit for moving the primary follower in pace with said stylus to track the rate of range closure as established by the rate of movement of the stylus, a secondary follower element constrained to move in a straight horizontal line radial to a given vertical axis, means establishing a point on said vertical axis spaced from the point of intersection of the horizontal radial line with the axis a distance representing the depth of the level of the underwater craft, means movable by the tracking unit with the movement of the primary follower for moving said secondary follower element along its constrained line of movement to close the distance between it and said established point at the rate of movement of the primary follower, and means maintaining a second horizontal line in intersection with the vertical axis of said secondary follower element and a second vertical axis horizontally spaced from said first axis, together with means for measuring the distance from said secondary follower to said second vertical axis.

8. In a triangle solver carried by a surface craft for directing a collision course between an underwater craft and a given missile to be dropped from the surface craft, range indicating means having a stylus movable in amount corresponding to range, a primary follower for the stylus, a tracking unit for moving the primary follower in pace with said stylus to track the rate of range closure as established by the rate of movement of the stylus, a secondary follower element constrained to move in a straight horizontal line radial to a given first vertical axis, means establishing a point on said vertical axis spaced from the point of intersection of the horizontal radial line with the axis a distance representing the depth of the level of the underwater craft, means movable by the tracking unit with the movement of the primary follower for moving said secondary follower element along its constrained line of movement to close the distance between it and said established point at the rate of movement of the primary follower, and means maintaining a second horizontal line in intersection with a second vertical axis, constituting the vertical axis of said secondary follower element and a third vertical axis horizontally spaced from said secondary follower axis, together with means for measuring the angle between said first and second vertical axes.

References Cited by the Examiner

UNITED STATES PATENTS

| | | | |
|---|---|---|---|
| 1,032,394 | 7/1912 | Fiske | 89—1.5 |
| 1,407,281 | 2/1922 | Just | 33—76 |
| 1,428,449 | 10/1922 | Prall | 33—76 |
| 2,206,777 | 7/1940 | Kee | 89—1.5 |
| 2,401,019 | 5/1946 | Rieber | 346—32 |
| 2,402,026 | 6/1946 | Crooke | 235—61.5 |
| 2,423,480 | 7/1947 | Caldwell | 346—32 |
| 2,451,856 | 10/1948 | Miller | 33—1 |
| 2,505,624 | 4/1950 | Molamphy | 33—76 |

FOREIGN PATENTS 542,792   1/1942   Great Britain.

LEONARD FORMAN, *Primary Examiner.*

ISAAS LISANN, ARTHUR M. HORTON, JAMES L. BREWRINK, SAMUEL BOYD, *Examiners.*

L. M. MEYERS, V. A. PISAPIA, *Assistant Examiners.*